United States Patent Office 3,429,614
Patented Feb. 25, 1969

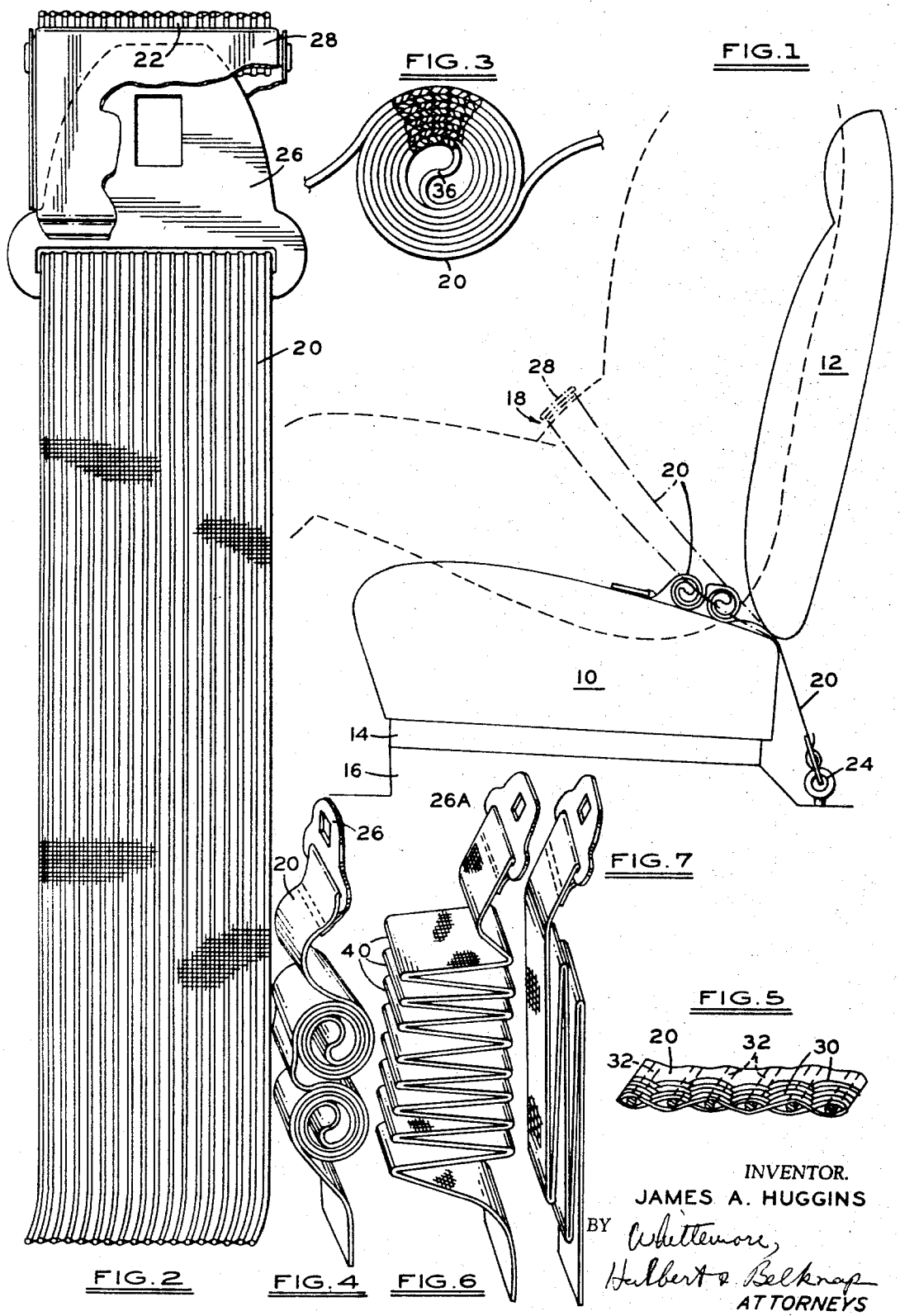

3,429,614
RETRACTABLE SEAT BELT
James A. Huggins, 3270 Westchester,
Birmingham, Mich. 48009
Filed Nov. 6, 1963, Ser. No. 321,769
U.S. Cl. 297—388                                   8 Claims
Int. Cl. A62b 35/00; D06c 7/02

This invention relates generally to retractable tensile members and refers more particularly to a retractable seat belt.

An essential object of the invention is to provide a retractable tensile member, which may be a seat belt member, having the characteristics of retractability built into the structure of the member itself, so that separate retracting mechanism is not required.

Another object is to provide such a member which in its free state condition has transversely folded portions to reduce the overall length thereof, the member being resiliently resistant to bending or unfolding so that it will automatically spring back to its free state condition when released.

Another object is to provide a flexible resilient member as described above, which may be in the form of a thermoplastic polyester film-like strip.

Another object is to provide a resilient flexible member which may be woven from flexible strands at least some of which are resiliently resistant to bending, the resilient strands being increasingly stressed as the portions of the member unfold when the member is extended.

Another object is to provide a flexible resilient member which is folded by being doubled over intermediate its ends and rolled into a spiral.

Another object is to provide a flexible resilient member which is doubled over along longitudinally spaced transverse lines alternately in one direction and the other to reduce the overall length of the member.

Other objects and features of the invention will become apparent as the description proceeds, especially when taken in conjunction with the accompanying drawing, wherein:

FIGURE 1 is a fragmentary side elevational view of a seat equipped with a seat belt constructed according to my invention, the seat belt being shown in solid lines in an inoperative or retracted position and in dot-dash lines in a position extending about the body of a person occupying the seat.

FIGURE 2 is an enlarged fragmentary view of the seat belt extended.

FIGURE 3 is a view partly in section and partly in side elevation illustrating the manner in which the seat belt rolls up into a spiral when released.

FIGURE 4 is a perspective view of one of the seat belt members shown in the inoperative or retracted position.

FIGURE 5 is a semi-diagrammatic, fragmentary view partly in section, showing an enlargement of the woven material of one of the seat belt members.

FIGURES 6 and 7 illustrate modifications of the invention.

The invention is shown and described as being embodied in a seat belt construction. It will be understood, however, that the principle of built-in retractability can be applied to other flexible elongated tensile members within the scope of this invention.

Referring now more particularly to the drawing, and especially to FIGURES 1–5, a seat 10 is illustrated having a back rest 12. The seat may be an automobile seat or an airplane seat, or the seat of any vehicle with which a seat belt might be employed. The seat 10 is shown mounted upon a support 14 on the floor structure 16 of the vehicle. A seat belt is provided, generally designated 18, and includes the two separate belt members 20 and 22.

One end of the seat belt members 20 is secured to the floor by an anchor 24. This anchor is at one side of the person occupying the seat. The belt member 20 extends from the anchor between the back of the seat 10 and the bottom portion of the back rest 12. It will be understood that the other seat belt member 22 is similarly anchored to the floor at the opposite side of the person occupying the seat 10, by an anchor which may be like the anchor 24. The belt member 22 likewise extends from its anchored end between the back of the seat 10 and the bottom of the back rest 12. The belt member 20 has a plate-like clasp 26 secured to its free end, which is adapted to fit into and releasably lock with a buckle 28 on the free end of the other seat belt member 22. The details of the clasp and buckle are not important as far as the present invention is concerned.

The two belt members 20 and 22 are of the same construction, and therefore it will be necessary to describe only one of them. The member 20 is an elongated flexible web of material, preferably of woven construction as shown in FIGURE 5. The transverse strands of the weave are designated 30 and the generally longitudinally extending strands are designated 32. A woven construction is customary in the manufacture of seat belts. At least some of the strands, in this instance the strands 32, are formed of a flexibly resilient material. Certain plastics are known to have resilient spring-like characteristics. One of these, and the preferred one for use with the present invention, is a plastic known as Mylar manufactured by DuPont. Mylar is a thermoplastic polyester. If it is heated in the neighborhood of 325° F. and kept at that temperature for a short period of time, say 15 minutes, and then cooled, it will tend to maintain the physical position it assumed while it was heated. In other words, a length of Mylar heated in a coiled condition will, upon cooling, tend to retain that coiled condition and will return by its inherent resilience when released after stretching. Plastics such as Mylar can also be given a resilient set by heating and cooling when the material is in a strand or thread-like form.

Some of the threads or strands making up the belt member, the strands 32 in this instance, are resilient in character. Preferably they are of the Mylar plastic material described above. They may also be of other plastics having similar resilient characteristics, and in a broad sense may even be metal strands. It is the resilient characteristic which is important, and the Mylar plastic has been found to be particularly suitable for this purpose.

The seat belt member 20 is coiled into two spirals as shown in FIGURE 4 prior to being heated. In the FIGURE 4 condition, it is heated as described above, that is for Mylar it is heated to approximately 325° F. for a period of perhaps 15 minutes. Actually the belt member will be heated to whatever greater or lesser temperature and for whatever longer or shorter period of time found to impart the desired resilient set to the plastic employed. Upon cooling, the belt member 20 will tend to resiliently retain the coiled condition shown in FIGURE 4. This coiled condition is perhaps better seen in FIGURE 3 in which it will be noted that the belt member 20 intermediate its ends is doubled over on itself into a fold designated 36, and the folded seat belt member is then rolled into a spiral. Preferably, although not necessarily, two spirals are rolled into the length of the seat belt member 20 as shown in FIGURE 4.

The seat belt member 20 after having been heated to impart the desired resilient character to some of the strands woven into the body thereof, will tend to assume the free state condition shown in FIGURE 4. In the FIGURE 4 condition, the resilient strands in the seat belt weave will be under little or no stress, in other words they will be close to their free state condition. When, however, the seat belt member 20 is extended, the coils will open out or unroll and put a progressively increasing stress on the plastic or resilient strands of the woven belt member. As a result, when the belt member is released it will return or retract naturally to the free state condition shown in FIGURE 4, in which it is rolled up or coiled into two spirals.

When not in use, the two seat belt members 20 and 22 will be in the retracted position shown in FIGURES 1 and 4, and may lie on the seat at opposite sides of the person occupying the seat. In this condition, the seat belt members are short and out of the way. They will not fall away out of reach of the person occupying the seat.

In use, the seat belt members 20 and 22 may be extended or uncoiled by grasping and pulling on their free ends, so that they will reach around the body of the person occupying the seat and the clasp and buckle 26 and 28 can be releasably snapped together. While the belt members 20 and 22 will be under a certain degree of tension, the tension will not be objectionable to the occupant of the seat, and in fact it will give him a feeling of security.

The seat belt members 20 and 22, being of the same construction, both will coil up in a retracted position in the same manner.

While it has been stated that only some of the strands or threads making up the weave of the seat belt members need be of a resilient character, it will be understood that all of the strands may be resilient and hence may be of the same material, preferably Mylar plastic.

It will also be understood that instead of being woven, the seat belt members 20 and 22 may be in the form of a solid strip or film of plastic or similar resilient material. Thus, for example, the illustration in FIGURE 4 may be considered either as showing a woven or a solid strip construction. The material of a solid type seat belt member will be of the same material as the strands of the woven construction. Thus a seat belt formed of a solid resilient strip could be simply a strip of Mylar plastic treated in the same manner described in connection with the woven type, so as to have the desired resilient characteristics of retracting to a free state condition as shown in FIGURE 4, and tending to spring back or return to that condition when extended.

FIGURE 6 illustrates a modification of the invention in which the seat belt member 20a is reduced in length, not by being rolled into a coil but by being folded back and forth alternately in one direction and the other. The folds 40 are in one direction and the folds 42 are in the opposite direction. The portions of the seat belt member between the folds, when in the free state condition illustrated, extend generally transversely of the length of the member. When the member is extended, the accordion-like folds will open out. There is a progressive increase in stress as the member is elongated, which will cause it to return to its natural free state condition when released in which the member is under little or no stress. This seat belt member 20a may be either of the woven type described above or it may be a solid strip or film-like member, and it will be used in conjunction with another similar belt member having a buckle 28a similar to the buckle 28 for releasable attachment to the clasp 26a. Otherwise the seat belt member of FIGURE 6 is like the one previously described.

FIGURE 7 illustrates a further modification which differs from FIGURE 6 only in that in the free state condition the portions of the seat belt member between the alternate transverse folds lie flat, that is generally parallel to the direction of length of the member.

What I claim as my invention is:

1. A seat belt device comprising an elongated, flexible member woven from flexible strands, said member in its free state condition being transversely distorted from a linear condition so that certain longitudinally extending sections of said member overlie one another to reduce the overall length of said member, means at one end of said member for anchoring the same, said member being adapted to be extended from said free state condition, means at the other end of said member to releasably secure said member in extended condition across the body of a person to serve as a safety belt, at least some of said longitudinally extending sections pulling away from overlying relation when said member is extended, at least some of the strands from which said member is woven being resilient and being increasingly stressed as longitudinally extending sections of said member are pulled away from overlying relation, whereby to cause said member to automatically spring back to its free state condition when said securing means is released.

2. The seat belt device defined in claim 1, wherein said resilient strands extend longitudinally of said member and are substantially unstressed in the free state condition aforesaid of said member.

3. The seat belt device defined in claim 1, wherein said resilient strands are formed of a thermoplastic polyester.

4. The seat belt device defined in claim 1, wherein said member is transversely distorted by being doubled over intermediate its ends and rolled into at least one coil to provide said overlying sections.

5. The seat belt device defined in claim 1, wherein said member is transversely distorted by being folded along longitudinally spaced transverse lines alternately in one direction and the other to provide said overlying sections.

6. In a seat belt device, an elongated, flexible member woven from flexible strands, said member in its free state condition being transversely distorted from a linear condition so that certain longitudinally extending sections of said member overlie one another to reduce the overall length of said member, said member being adapted to be extended from said free state condition and secured in its extended condition across the body of a person to serve as a seat belt, at least some of said longitudinally extending sections pulling away from overlying relation when said member is extended, at least some of the strands from which said member is woven, being resilient and being increasingly stressed as longitudinally extending sections of said member are pulled away from overlying relation, whereby to cause said member to automatically spring back to its free state condition when released.

7. In combination, a length of seat belting, a fastener member connected to one end of said belting for fastening the belting to a support, the other end of said belting being releasably latchable to another element in a manner to retain a person in a seat, a longitudinal section of said belting between the ends thereof being retractable upon itself to reduce the length of said section and thereby retract said other end of the belting toward the support when said other end is released, said section when retracted being disposed entirely on one side of said fastener member whereby said seat belting can retract toward the support without winding about said fastener member.

8. The invention as defined in claim 7, wherein said longitudinal section comprises an elongated prestressed resin strip which automatically retracts when released to reduce the length of said longitudinal section.

References Cited

UNITED STATES PATENTS

| | | | |
|---|---|---|---|
| 1,313,644 | 8/1919 | Simon | 242—107.11 |
| 2,143,649 | 1/1939 | Dansard | 174—69 |
| 2,312,301 | 3/1943 | Turner | 161—132 |
| 2,439,815 | 4/1948 | Sisson | 161—173 |
| 2,712,513 | 7/1955 | Breslow | 161—132 |
| 2,795,641 | 6/1957 | Rowell | 174—135 |
| 2,865,979 | 12/1958 | Klassen | 174—69 |
| 2,874,754 | 2/1959 | Yost | 161—132 |
| 3,032,374 | 5/1962 | Robinson | 297—388 |
| 3,116,092 | 12/1963 | Spranger | 297—388 |
| 3,132,898 | 5/1964 | Kittelson | 297—386 |
| 3,137,526 | 6/1964 | Carreberg | 297—388 |
| 3,163,467 | 12/1964 | Deneau | 297—388 |

FOREIGN PATENTS

| | | |
|---|---|---|
| 838,402 | 5/1952 | Germany. |
| 338,215 | 11/1930 | Great Britain. |

CASIMIR A. NUNBERG, *Primary Examiner.*

U.S. Cl X.R.

264—137